(12) United States Patent
Sankaranarayanan et al.

(10) Patent No.: US 10,705,970 B1
(45) Date of Patent: Jul. 7, 2020

(54) ENHANCED ADDRESS COMPACTION

(71) Applicant: Seagate Technology LLC, Cupertino, CA (US)

(72) Inventors: Sundararajan Sankaranarayanan, Fremont, CA (US); Erich Franz Haratsch, San Jose, CA (US)

(73) Assignee: Seagate Technology LLC, Fremont, CA (US)

( * ) Notice: Subject to any disclaimer, the term of this patent is extended or adjusted under 35 U.S.C. 154(b) by 196 days.

(21) Appl. No.: 15/594,524

(22) Filed: May 12, 2017

(51) Int. Cl.
*G06F 12/10* (2016.01)

(52) U.S. Cl.
CPC .......... *G06F 12/10* (2013.01); *G06F 2212/65* (2013.01)

(58) Field of Classification Search
CPC ..... G06F 12/0246; G06F 3/0679; G06F 12/10
USPC ......... 711/103, E12.008, E12.001, 207, 202, 711/E12.058, 206
See application file for complete search history.

(56) References Cited

U.S. PATENT DOCUMENTS

| 9,552,289 | B1 * | 1/2017 | Spencer | G06F 12/0246 |
| 2004/0213275 | A1 * | 10/2004 | Basso | H04L 12/4625 370/411 |
| 2006/0015772 | A1 * | 1/2006 | Ang | G06F 12/0284 714/6.32 |
| 2008/0016289 | A1 * | 1/2008 | Pennock | G06F 13/1694 711/148 |
| 2012/0324251 | A1 * | 12/2012 | Bolanowski | G06F 1/3203 713/300 |
| 2013/0275652 | A1 * | 10/2013 | Simionescu | G06F 3/0607 711/103 |
| 2014/0025770 | A1 * | 1/2014 | Warfield | G06F 15/17331 709/213 |
| 2015/0169465 | A1 | 6/2015 | Slepon | |
| 2015/0186287 | A1 * | 7/2015 | Kass | G06F 12/126 711/134 |
| 2015/0220277 | A1 | 8/2015 | Lee | |
| 2018/0150389 | A1 * | 5/2018 | Bhargava | G11C 13/0002 |

* cited by examiner

*Primary Examiner* — Tuan V Thai
*Assistant Examiner* — Edward Waddy, Jr.
(74) *Attorney, Agent, or Firm* — Setter Roche LLP; Kirk A Cesari

(57) ABSTRACT

An apparatus may include a circuit configured to determine a first encoded address is in a bitwise range of addresses, determine a first physical address in a storage memory from the first encoded address using bitwise mapping and retrieve first data from the first physical address in the storage memory. The circuit may further be configured to determine a second encoded address is in an offset linear range of addresses, determine a second physical address in the storage memory from the second encoded address using offset linear mapping and write second data to the second physical address in the storage memory.

20 Claims, 8 Drawing Sheets

ENHANCED ADDRESS COMPACTION

SUMMARY

In certain embodiments, an apparatus may include a circuit configured to determine a first encoded address is in a bitwise range of addresses, determine a first physical address in a storage memory from the first encoded address using bitwise mapping and retrieve first data from the first physical address in the storage memory. The circuit may further be configured to determine a second encoded address is in an offset linear range of addresses, determine a second physical address in the storage memory from the second encoded address using offset linear mapping and write second data to the second physical address in the storage memory.

In certain embodiments, a system may include a storage controller circuit configured to determine a first encoded address is in a bitwise range of addresses, and determine a first physical address in a storage memory from the first encoded address using bitwise mapping. The storage controller circuit may further determine a second encoded address is in an offset linear range of addresses and determine a second physical address in the storage memory from the second encoded address using offset linear mapping. The system may further include a read/write channel a circuit configured to retrieve first data from the first physical address in the storage memory and write second data to the second physical address in the storage memory.

In certain embodiments, a method may include receiving, at the storage controller circuit, field information of a storage memory controlled by the storage controller circuit and determining, by the storage controller circuit, based on the field information, whether to utilize enhanced compaction addressing. If the determination determines to use enhanced compaction addressing, the storage controller circuit may utilize enhanced compaction addressing in controlling the storage memory. If the determination does not determine to use enhanced compaction addressing, the storage controller circuit may utilize bitwise addressing in controlling the storage memory.

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with another embodiment, the methods and functions described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or device including instructions that when executed cause a processor to perform the methods.

In some storage systems, controllers may map between types of addresses, for example, between logical addresses and physical locations. The addresses mapped to the logical addresses may be encoded. To determine the physical location, the encoded address mapped to the logical address may need to be decoded. Encoding and decoding addresses may happen in the data path and, as such, may have an impact on performance and storage efficiency. Some addressing schemes may provide increased performance at the cost of storage efficiency or vice versa. Some embodiments of the addressing schemes disclose herein may provide both improved performance and storage efficiency. In addition, some embodiments according to this disclosure may provide for a system that determines an addressing scheme for a storage system.

Figure 1:
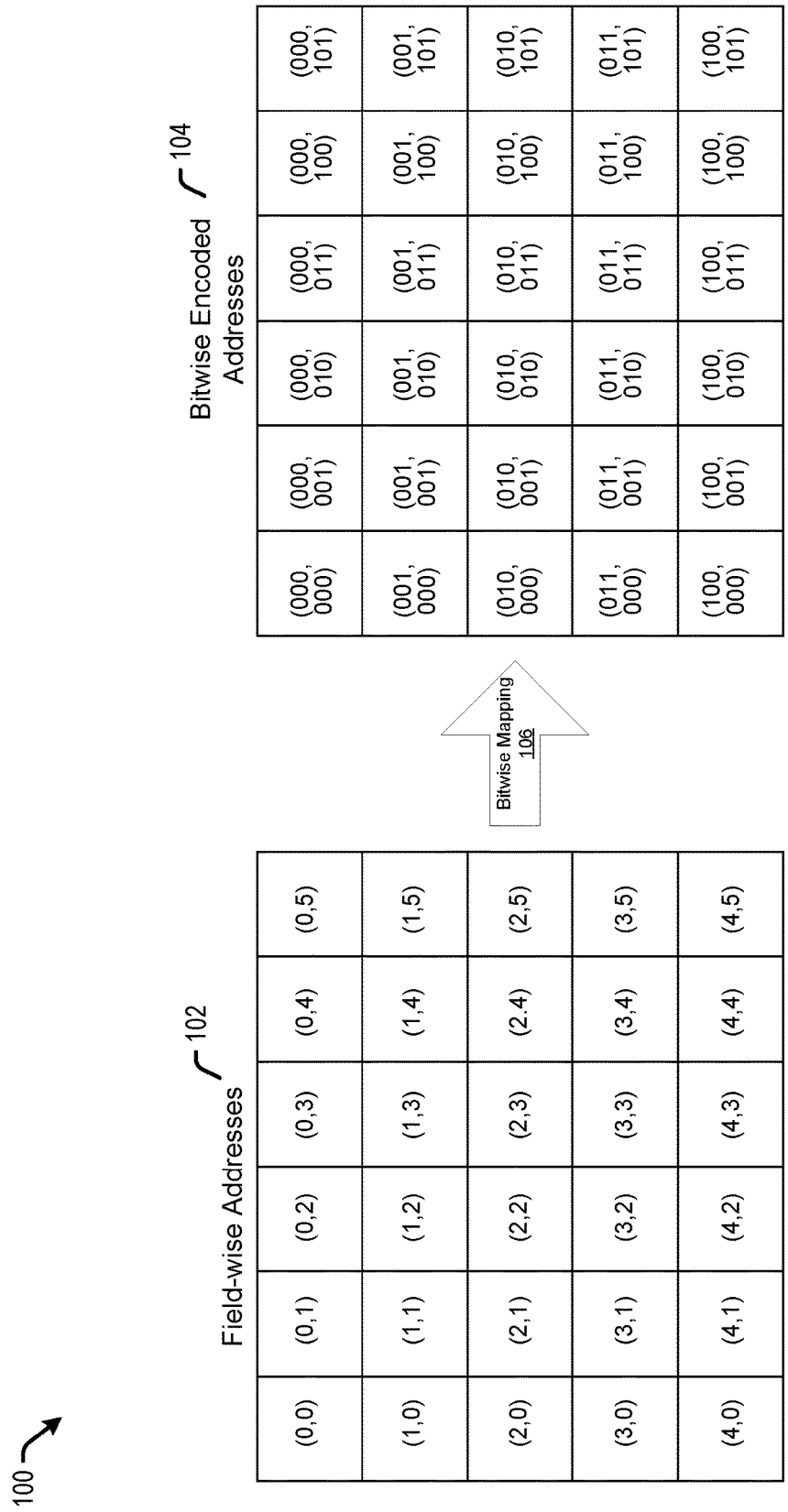
FIG. 1 is a diagram of a bitwise mapping scheme, in accordance with certain embodiments of the present disclosure.

FIG. 1 illustrates a diagram of a bitwise mapping scheme 100 according to some embodiments herein. In particular, FIG. 1 shows a bitwise mapping 106 from field-wise addresses 102 to bitwise encoded addresses 104. In some embodiments, the field-wise addresses may represent physical addresses within a storage device, such as a solid-state drive. In some examples, each field may address of the dies, planes, blocks, pages, cells, etc. In other examples, multiple fields may address the same storage level (e.g. multiple fields for pages within a block). Although the examples discussed herein utilize two fields, embodiments are not so limited and any number of fields may be utilized. For example, the example equations discussed below may apply to embodiments with two fields. However, the equations for embodiments with any numbers of fields may be derived by one of ordinary skill in the art in view of this disclosure. In the diagrams of FIGS. 1-4, the first field of the field-wise addresses is mapped to rows and the second field of the field-wise addresses is mapped to columns.

The cells or locations of bitwise encoded addresses 104 correspond to the cells of the field-wise addresses 102 and include corresponding bitwise encoded addresses.

In the bitwise mapping scheme illustrated in FIG. 1, the number of bits of the address may be the sum of the ceilings of the binary logarithms of the maximum value of the fields plus one (referred to hereafter as a dimension) which may be written as:

$$B = \sum_{i=0}^{n} \lceil \log_2 D_i \rceil$$

where B may be the number of bits in the bitwise encoded addresses, n may be the number of fields, $D_i=M_i+1$, and $M_i$ may be the maximum value of the i-th field.

In other words, the number of bits in the bitwise encoded addresses may be equal to the sum of the minimum number of bits required to represent the maximum values of the fields. In the illustrated example of FIG. 1, the maximum values of the fields are four (4) and five (5). Three bits are needed to represent both four and five. As such, the bitwise encoded addresses may include six (6) bits (e.g. 3+3=6).

As will be discussed in more detail below, in comparison to other encoding schemes, bitwise encoding may provide increase performance but may reduce storage efficiency.

Decoding from a bitwise encoded address may be performed as follows:

$x$=bin2dec($epa$(0:$s$−1))

$y$=bin2dec($epa$($s$:$t$−1))

where x is the first field of the field-wise address; y is the second field of the field-wise address; epa(a:b) is a function which may return the a-th through b-th bits of the bitwise encoded address, s is the number of bits in the first field; and t is the total number of bits in the field-wise addresses.

Encoding from a field-wise address to the corresponding bitwise encoded address may be performed as follows:

$epa$=[dec2bin($x$),dec2bin($y$)]

where x is the first field of the field-wise address; y is the second field of the field-wise address; and epa is the bitwise encoded address.

Figure 2:
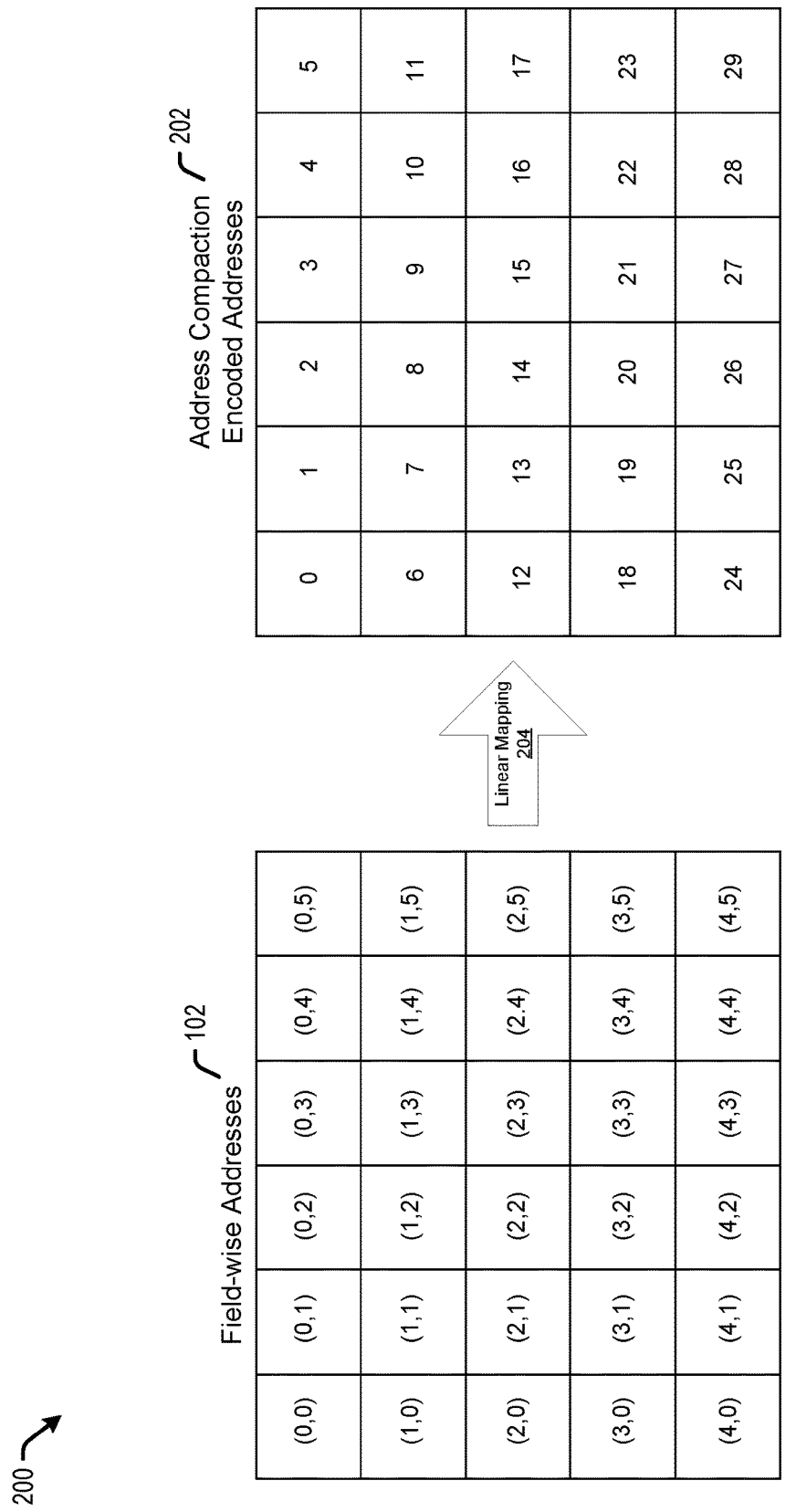
FIG. 2 is a illustrates a diagram of an address compaction mapping scheme, in accordance with certain embodiments of the present disclosure.

FIG. 2 illustrates a diagram of an address compaction mapping scheme 200 according to some embodiments herein. In particular, FIG. 2 shows a linear mapping 204 from field-wise addresses 102 to address compaction encoded addresses 202. Similar to the bitwise encoded addresses 104 of FIG. 1 above, the cells of address compaction encoded addresses 202 correspond to the cells of the field-wise addresses 102 and include corresponding the address compaction encoded addresses.

In the address compaction encoding scheme illustrated in FIG. 2, the number of bits of the address compaction encoded address may be the ceiling of the binary logarithm of the product of the dimensions of the fields which may be written as:

$$B = \left\lceil \log_2 \prod_{i=0}^{n} D_i \right\rceil$$

where B may be the number of bits in the address compaction encoded addresses, n may be the number of fields, $D_i=M_i+1$, and $M_i$ may be the maximum value of the i-th field.

In other words, the number of bits in the address compaction encoded addresses may be equal to the minimum number of bits required to address the number of cells. In the illustrated example of FIG. 1, the dimensions of the fields are five (5) and six (6) for a total of thirty (30) cells. As such, the address compaction encoded addresses may include five (5) bits, the minimum number of bits needed to address 30 cells.

In comparison to the bitwise encoding scheme above, address compaction encoding may provide increase storage efficiency. However, address compaction encoding may provide reduced performance due to additional complexity in encoding and decoding. In particular, address compaction mapping may include matrix operations which may cause address compaction mapping to be more complex than bitwise address mapping.

Encoding from a two field field-wise address to the corresponding address compaction encoded address may be performed as follows:

$epa$=[$x,y$]*[$D_y$,1]' where x is the first field of the field-wise address; y is the second field of the field-wise address; and epa is the address compaction encoded address; $D_y=M_y+1$, and $M_y$ is the maximum value of the y field of the field-wise addresses.

Decoding from an address compaction encoded address may be performed as follows:

$$x = \left\lfloor \frac{epa}{D_y} \right\rfloor$$

$$y = epa - (x * D_y)$$

where x is the first field of the field-wise address; y is the second field of the field-wise address; epa is the address compaction encoded address, $D_y=M_y+1$, and $M_y$ is the maximum value of the y field of the field-wise addresses.

Bitwise addressing may be storage optimal when the number of bits needed to represent the bitwise encoded address is the same as the number needed to represent the address compaction encoded address. This condition may be satisfied when the following equation is true:

$$\sum_{i=0}^{n} \lceil \log_2 D_i \rceil = \left\lceil \log_2 \prod_{i=0}^{n} D_i \right\rceil$$

where n may be the number of fields, $D_i=M_i+1$, and $M_i$ may be the maximum value of the i-th field.

The above equation may be true if the $D_i$'s are powers of 2. However, the equation may be true for other cases as well, for example, when the $D_i$'s are seven (7). In this case, both sides of the equation are six (6) which may mean that both bitwise addressing and address compaction addressing may need six bits.

Figure 3:
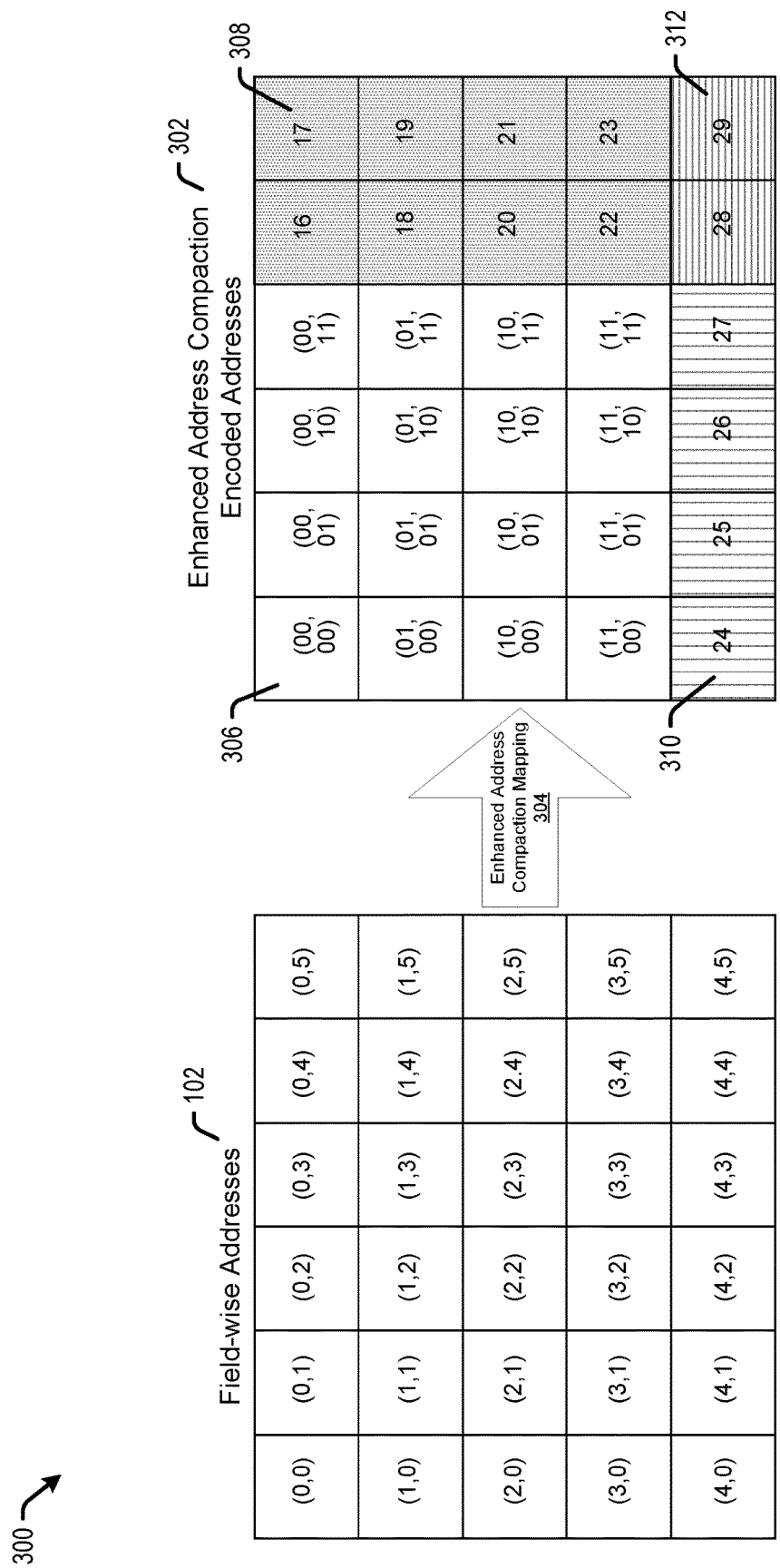
FIGS. 3 and 4 are diagrams of an enhanced address compaction mapping scheme, in accordance with certain embodiments of the present disclosure.

FIG. 3 illustrates a diagram of an enhanced address compaction mapping scheme 300 according to some embodiments herein. In particular, FIG. 3 shows an enhanced address compaction mapping 304 from field-wise addresses 102 to enhanced address compaction encoded addresses 302. Similar to the bitwise encoded addresses 104 of FIG. 1 above, the cells of the enhanced address compaction encoded addresses 302 correspond to the cells of the field-wise addresses 102 and include corresponding enhanced address compaction encoded addresses.

Enhanced address compaction mapping may be considered a hybridization of bitwise address mapping and address compaction mapping. In particular, in enhanced address compaction encoding, a portion of addresses may be encoded and decoded using a modified bitwise address mapping while the remainder of addresses may be encoded and decoded using an offset linear mapping scheme. In some cases, this approach may provide a solution that may provide performance and storage efficiency.

The enhanced address compaction mapping scheme illustrated in FIG. 3 may have address lengths of the same number of bits as the address compaction encoded addresses discussed above with regard to FIG. 2. In other words, the number of bits in the enhanced address compaction encoded addresses may be equal to the minimum number of bits required to address the number of cells. In the illustrated example of FIG. 3, the dimensions of the fields are five (5) and six (6) for a total of thirty (30) cells. As such, the enhanced address compaction encoded addresses may include five (5) bits, the minimum number of bits needed to address 30 cells.

Figure 4:
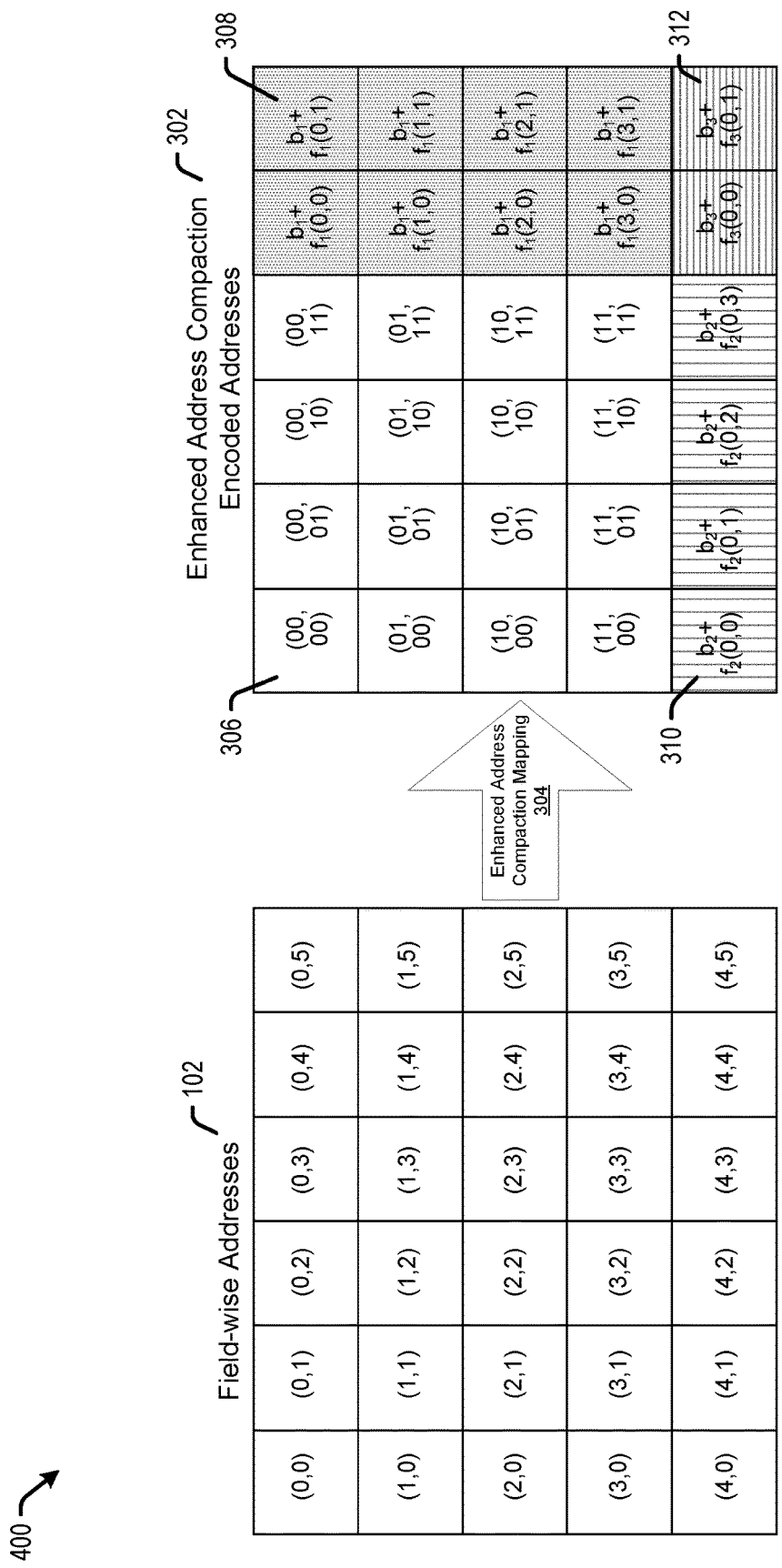

As mentioned above, the enhanced address compaction mapping scheme may encode and decode a portion of addresses using a modified bitwise mapping scheme and encode and decode the remainder using an offset linear mapping scheme. As shown in FIG. 3, the addresses may be divided into four sections or ranges 306-312. In the illustrated example, addresses included in section 306 may be encoded and decoded using bitwise mapping (e.g. a bitwise range of addresses) while each of sections 308-312 may be mapped separately using offset linear mapping (e.g. offset linear ranges). FIG. 4 provides additional illustration of the division of sections 306-312.

In some examples, the dimensions of the bitwise address mapping section (e.g. section 0 306) may be determined as follows:

$$D_x^0 = \lfloor \log_2 D_x \rfloor$$

$$D_y^0 = \lfloor \log_2 D_y \rfloor$$

where x is the first field of the field-wise address; y is the second field of the field-wise address; $D_i = M_i + 1$, $M_i$ is the maximum value of the i-th field of the field-wise addresses for i=x and y, and $D_i^0 = M_i^0 + 1$, $M_i^0$ is the maximum value of the i-th field of the bitwise mapping section (e.g. section 0 306) of the enhanced address compaction encoded addresses for i=x and y.

In other words, the dimension of a field of the bitwise section may be determined to be the largest power of two which is less than or equal to the dimension of the corresponding field of the field-wise addresses. In the illustrated example of FIGS. 3 and 4, both fields of the bitwise mapping section 306 may be two bits in length because four (4) is the largest power of two which is less than five (5) and six (6). In another example in which the dimensions of the fields of the field-wise addresses are six (6) and nine (9), the dimensions of the corresponding fields of the bitwise section 306 may be four (4) and eight (8) and the corresponding numbers of bits may be two (2) and three (3).

In some examples, the dimensions of the offset linear mapping sections (e.g. section 1-3 308-312) may be determined as follows:

$$D_x^1 = D_x^0$$

$$D_y^1 = D_y - D_y^0$$

$$D_x^2 = D_x - D_x^0$$

$$D_y^2 = D_y^0$$

$$D_y^3 = D_y - D_y^0$$

$$D_x^3 = D_x - D_x^0$$

where x is the first field of the field-wise address; y is the second field of the field-wise address; $D_i$ is the dimension of the i-th field of the field-wise addresses for i=x and y, $D_i^0$ is the dimension of the i-th field of the bitwise mapping section of addresses in the enhanced address compaction addresses for i=x and y, $D_i^t$, t=1, 2, and 3 is the dimension of the i-th field of the t-th offset linear section of addresses in the enhanced address compaction addresses for i=x and y. In the illustrated example of FIG. 3, t=1 for section 1 308, t=2 for section 2 310, and t=3 for section 3 312.

Encoding from a two field field-wise address to the corresponding enhanced address compaction encoded address may begin with a determination of the type of the address and section the address is located in.

In particular, if $x < D_x^0$ and $y < D_y^0$, the address corresponds to the bitwise mapping section (e.g. section 0 306) and the mapping may be performed as:

$$epa = [0^r, \text{dec2bin}(x), \text{dec2bin}(y)]$$

where x is the first field of the field-wise address; y is the second field of the field-wise address; $r = \text{length}(epa) - (D_x^0 + D_y^0)$; the dec2bin( ) function retains leading zeros, and epa is the corresponding enhanced address compaction encoded address. For example, the field-wise address (2, 1) may encode to the enhanced address compaction encoded address [0 10 01] and the field-wise address (3, 3) may encode to the enhanced address compaction encoded address [0 11 11].

If $x \geq D_x^0$ or $y \geq D_y^0$, the address may correspond to a offset linear mapping section (e.g. section 1 308, section 2 310 or section 3 312). In particular, if $x < D_x^0$ and $y \geq D_y^0$, the address may correspond to section 1 308; if $x \geq D_x^0$ and $y < D_y^0$, the address may correspond to section 2 310; and if $x \geq D_x^0$ and $y \geq D_y^0$, the address may correspond to section 3 312.

Encoding from the field-wise address to an offset linear encoded address in the corresponding offset linear mapping section t may be performed as:

$$epa = \text{dec2bin}(b_t + [x - x_t, y - y_t] * [D_y^t, 1]')$$

where x is the first field of the field-wise address; y is the second field of the field-wise address; $b_t$ is a offset value of the section t which may be the total of the numbers of addresses in sections occurring before the $t^{th}$ section; $x_t$ is the smallest value of x in the section t; $y_t$ is the smallest value of y in the section t; $D_y^t$ is the dimension of the y field in the section t; and epa is the corresponding enhanced address compaction encoded address. In the example illustrated in FIG. 3, the offset of section 1 308 (e.g. $b_1$) is 16, the offset of section 2 310 (e.g. $b_2$) is 24, and the offset of section 3 312 (e.g. $b_3$) is 28. As such, the field-wise address (1, 5) may encode to the enhanced address compaction encoded address [10011] (e.g. (16+([(1−0), (5−4)] *[2,1]'))) and the field-wise address (4, 2) may encode to the enhanced address compaction encoded address [11010] (e.g. (24+([(4−4), (2−0)] *[4,1]'))). It should be noted that the order of the sections and offsets is not limited to the order shown herein. In addition, a set of smallest values of the fields in a section (e.g. $[x_t, y_t]$) may be referred to herein as a section location.

Decoding from an enhanced address compaction encoded address to a field-wise address may also begin with a determination of the section the address is located in. In particular, if the epa is less than the smallest offset of the offset linear mapping sections, the address may correspond to the bitwise mapping section (e.g. section 0 306) and the mapping may be performed as:

$$x = \text{bin2dec}(epa(1:s-1))$$

$$y = \text{bin2dec}(epa(s:t-1))$$

where x is the first field of the field-wise address; y is the second field of the field-wise address; epa(a:b) is a function which may return the a-th through b-th bits of the enhanced address compaction encoded address, s is the number of bits in the first field; and t is the total number of bits in the enhanced address compaction encoded address. The range of the epa function utilized for the x term may be (0:s−1) if the bitwise mapping section maps to more than half of the memory. In other words, decoding of the modified bitwise mapping of enhanced address compaction scheme may include subdividing the encoding address into bit ranges which correspond to the fields of the fieldwise address.

If the encoded address is not in the bitwise mapping section, the offset linear mapping section in which the corresponding physical address is located may be determined based on the offsets of the sections (e.g. using a series of less than comparisons or comparisons of the ranges of the sections to the address). Once the section t has been determined, the decoding may be performed as follows:

$$x = \left\lfloor \frac{epa - b_t}{D_y^t} \right\rfloor + x_t$$

$$y = ((epa - b_t) - ((x - x_t) * D_y^t)) + y_t$$

where x is the first field of the field-wise address; y is the second field of the field-wise address; $b_t$ is the offset value of the section t; $x_t$ is the smallest value of x in the section t; $y_t$ is the smallest value of y in the section t; $D_y^t$ is the dimension of the y field in the section t; and epa is the enhanced address compaction encoded address. In other words, decoding of the offset linear mapping of enhanced address compaction scheme may include performing linear mapping to determine a field-wise location of the encoded address within the corresponding section and adding a field-wise section location of the section to the field-wise location of the encoded address within the section.

Figure 5:
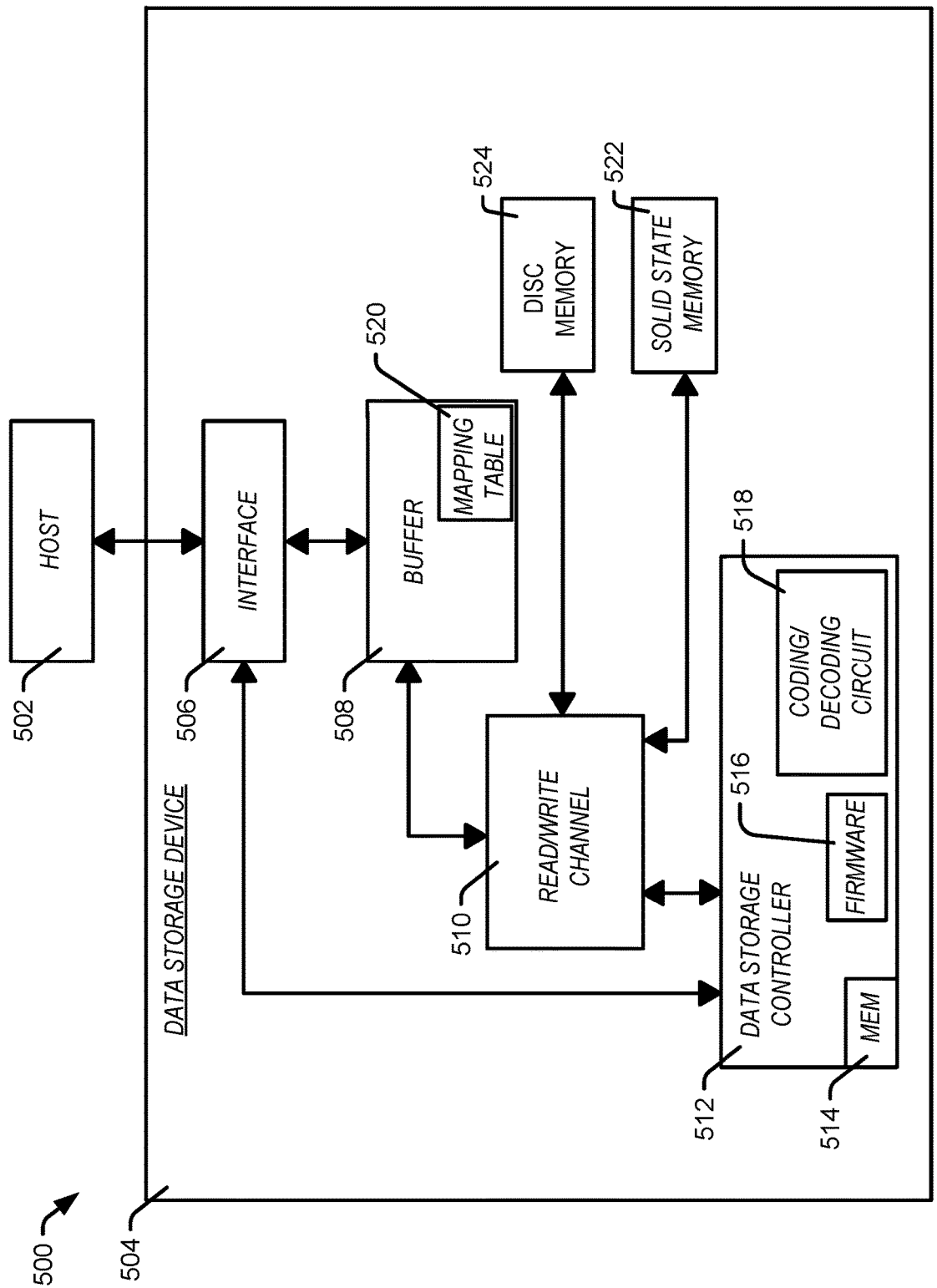
FIG. 5 is a diagram of a system including address mapping, in accordance with certain embodiments of the present disclosure.

Referring to FIG. 5, a diagram of a system including address mapping is shown and generally designated 500. In some examples, the system 500 may implement the schemes and functions described herein. A data storage device ("DSD") 504 can optionally connect to be removable from a host device 502, which can be a computer, a host bus adapter, a bus expander, a server, a telephone, a music player, another electronic device, or any combination thereof. The DSD 504 can communicate with the host device 502 via the hardware and firmware based host interface circuit 506 that may include a connector that allows the DSD 504 to be physically connected and physically disconnected from the host device 502.

The DSD 504 can include a data storage controller 512, which can include associated memory 514, firmware 516, and an encoding/decoding circuit (EDC) 518. A buffer 508 can temporarily store data during read and write operations. In some cases, the buffer 508 can be a volatile memory, such as DRAM, SRAM, or other volatile memory. In some examples, the EDC 518 may perform mapping between encoded addresses and the physical addresses as discussed above (e.g. as discussed above with respect to FIGS. 1-4). The firmware 516 may have instructions that when executed by the controller 512, cause the controller 512 to perform certain functions, such as mapping table lookups, mapping table entry modifications, or other tasks. The mapping table 520 may include logical block address ("LBA") to encoded address mappings corresponding to the data stored by the DSD 504, for example, in the SSM 522. Further, the DSD 504 can include a read/write (R/W) channel 510 which can encode data during write operations and decode data during read operations. The R/W channel 510 may be coupled to an SSM 522, and a disc memory 524.

The EDC 518 may encode and decode encoded addresses stored in the mapping table 520 in the SSM 522. The mapping table 520 may include information about where in the SSM 522 data is stored. For example, the physical addresses from which the encoded addresses are generated may include a channel address field, die address field, block address field, and so forth. When data in the SSM 522 is accessed, mapping table entries in the mapping table 520 may be decoded by the EDC 518, and provided to the data storage controller 512. The data storage controller 512 can execute instructions of the firmware to cause the data storage controller 512 to determine a location of the data based on the decoded mapping table entries.

When data is stored to the SSM 522, the data storage controller 512 may determine a storage location for the data. The EDC 518 may encode the physical address of the storage location for the data storage controller 512. In turn, the data storage controller 512 can update mapping table entries in the mapping table 520 with the encoded address. For example, the mapping table entries may be stored to the mapping table 520 by the data storage controller 512, such as via the R/W channel 510.

Figure 6:
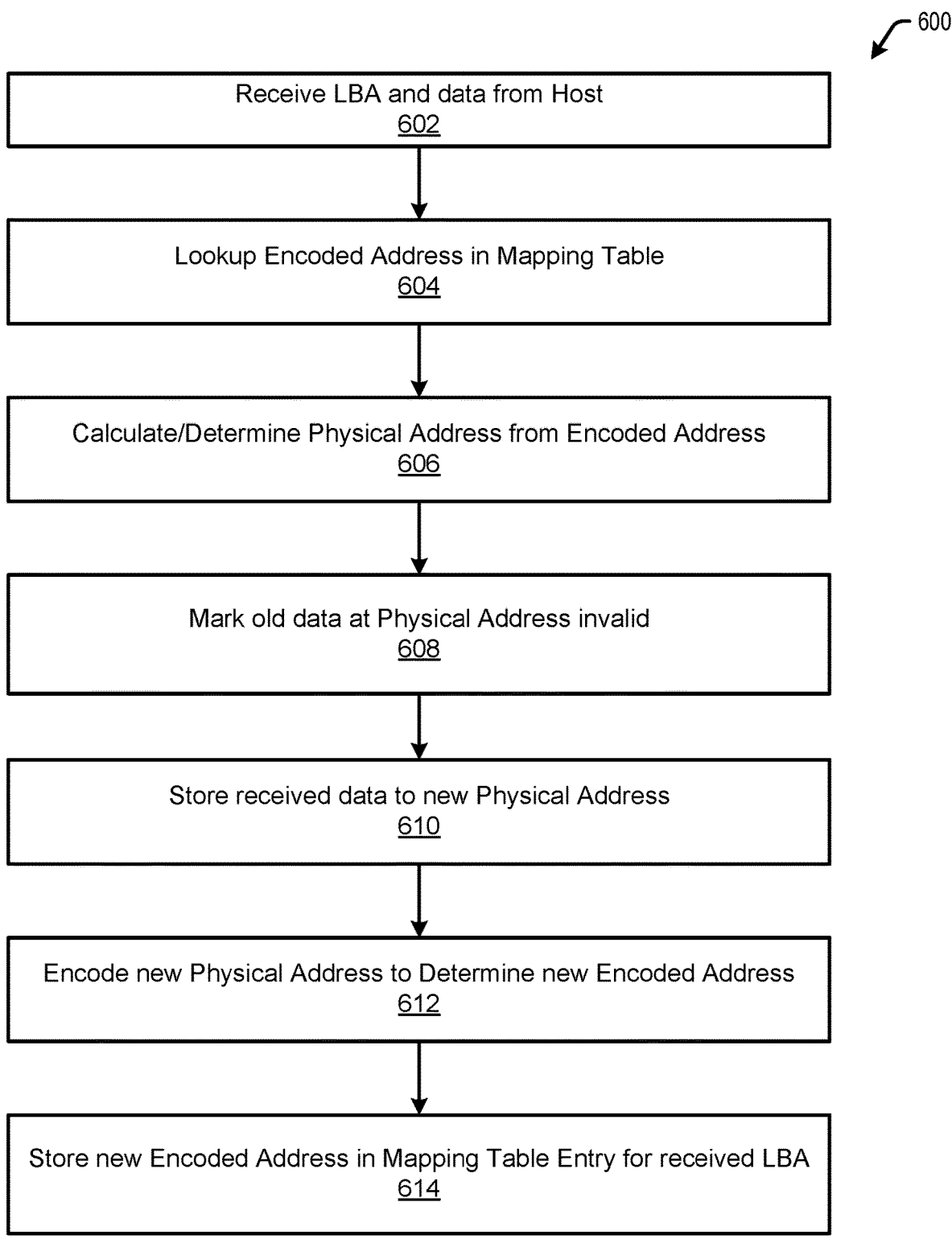
FIG. 6 is a flowchart of a method for enhanced address compaction, in accordance with certain embodiments of the present disclosure.

Referring to FIG. 6, a flowchart of a method for enhanced address compaction is shown and is generally designated 600. The method 600 can be an embodiment of the systems and techniques discussed above regarding 100, 200, 300, 400 and 500. The operations of method 600 may be performed as detailed above with respect to FIGS. 1-5.

The system may receive a logical block address (LBA) and data to be stored from a host at 602. The system may then perform a lookup in a mapping table to determine the current encoded address corresponding to the LBA at 604.

Based on the current encoded address determined from the mapping table, the system may calculate or determine a physical address storing data currently associated with the received LBA at 606. Then, at 608, the system may mark the data at the current physical address as invalid. Of course, in a response to a read request from a host, the data may be retrieved from the physical address and returned to the host.

At 610, the data received from the host may be stored to a new physical address (e.g. a next physical address). At 612, the system may encode the new physical address to determine a new encoded address. Then, at 614, the new encoded address may be stored to the mapping table entry for the received LBA.

Figure 7:
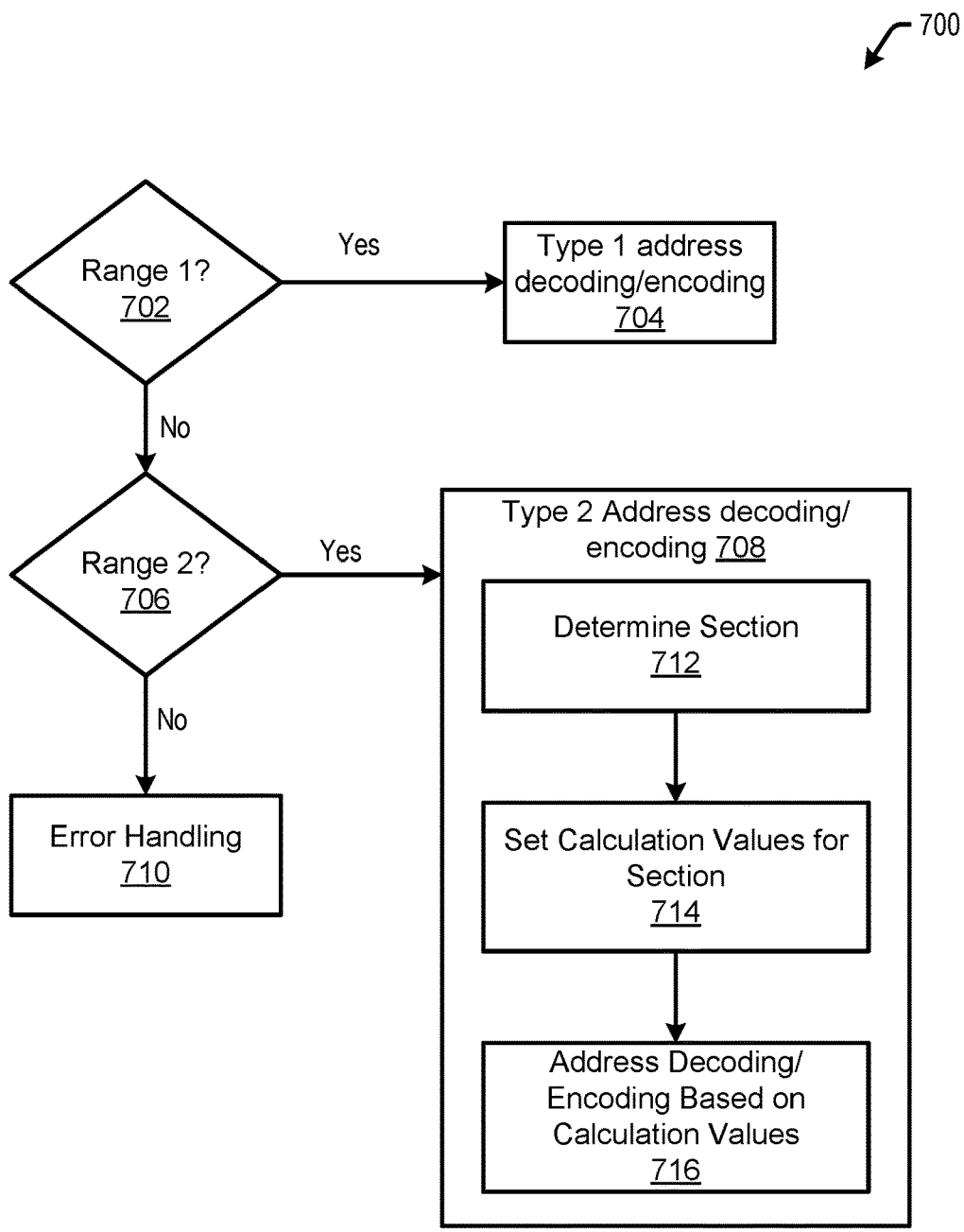
FIG. 7 is a flowchart of a method for enhanced address compaction, in accordance with certain embodiments of the present disclosure.

Referring to FIG. 7, a flowchart of a method for enhanced address compaction is shown and is generally designated 700. The method 700 can be an embodiment of the systems and techniques discussed above regarding 100, 200, 300, 400, 500 and 600. The operations of method 700 may be an example embodiment of the operations performed by method 600 at 606 and may be performed as detailed above with respect to FIGS. 1-5.

As mentioned above, the system may receive a logical block address (LBA) from a host, and perform a lookup in a mapping table to determine the encoded address corresponding to the LBA. Based on the encoded address determined from the mapping table, the system may calculate or determine a physical address as follows.

At 702, the system may determine whether the encoded address is in a first range. Taking for example the embodiment illustrated in FIGS. 3 and 4, the first range may correspond to section 0 306 (e.g. bitwise ranges). In the example of FIGS. 3 and 4, the encoded address may be within the range corresponding to section 0 306 if it is less than 16, the smallest offset of the remaining sections. If the encoded address is in the first range, the process may continue to 704. Otherwise, the process may continue to 706.

At 704, the encoded address may be encoded or decoded using a type 1 address decoding/encoding. In the above discussed example, the type 1 address decoding/encoding scheme may be the bitwise address mapping of the enhanced compaction addressing scheme.

At 706, the system may determine whether the encoded address is in a second range. If so, the process may move to 708. Otherwise, the process may continue to 710. Taking for example the embodiment illustrated in FIGS. 3 and 4, the second range may correspond to sections 1 308, 2 310 and 3 312 (e.g. the offset linear ranges). In the example of FIGS. 3 and 4, the encoded address may be within the range corresponding to sections 1-3 308-312 if it is greater or equal to 16 and less than or equal the total number of addresses (e.g. 30).

At 708, the encoded address may be encoded or decoded using a type 2 address decoding/encoding. In the above discussed example, the type 2 address decoding/encoding scheme may be the modified compaction address mapping of the enhanced compaction addressing scheme. More particularly, at 712, the system may determine the section to which the encoded address corresponds. For example, at 712, a series of less than determinations with respect to the encoded address and the offsets of the sections may be utilized. At 714, the system may setup calculation values for the determined section. For example, the system may set up the calculation based on the section location, offset, dimensions, etc. of the determined section. Then, at 716, the system may perform the above discussed offset linear mapping of the enhanced compaction addressing scheme using the encoded address and the calculation values for the determined section.

Returning to 710, if the encoded address is not within range 1 or range 2, an error may be returned (e.g. to a host that requested a read or write) or, in some examples, another type of addressing may be utilized.

Figure 8:
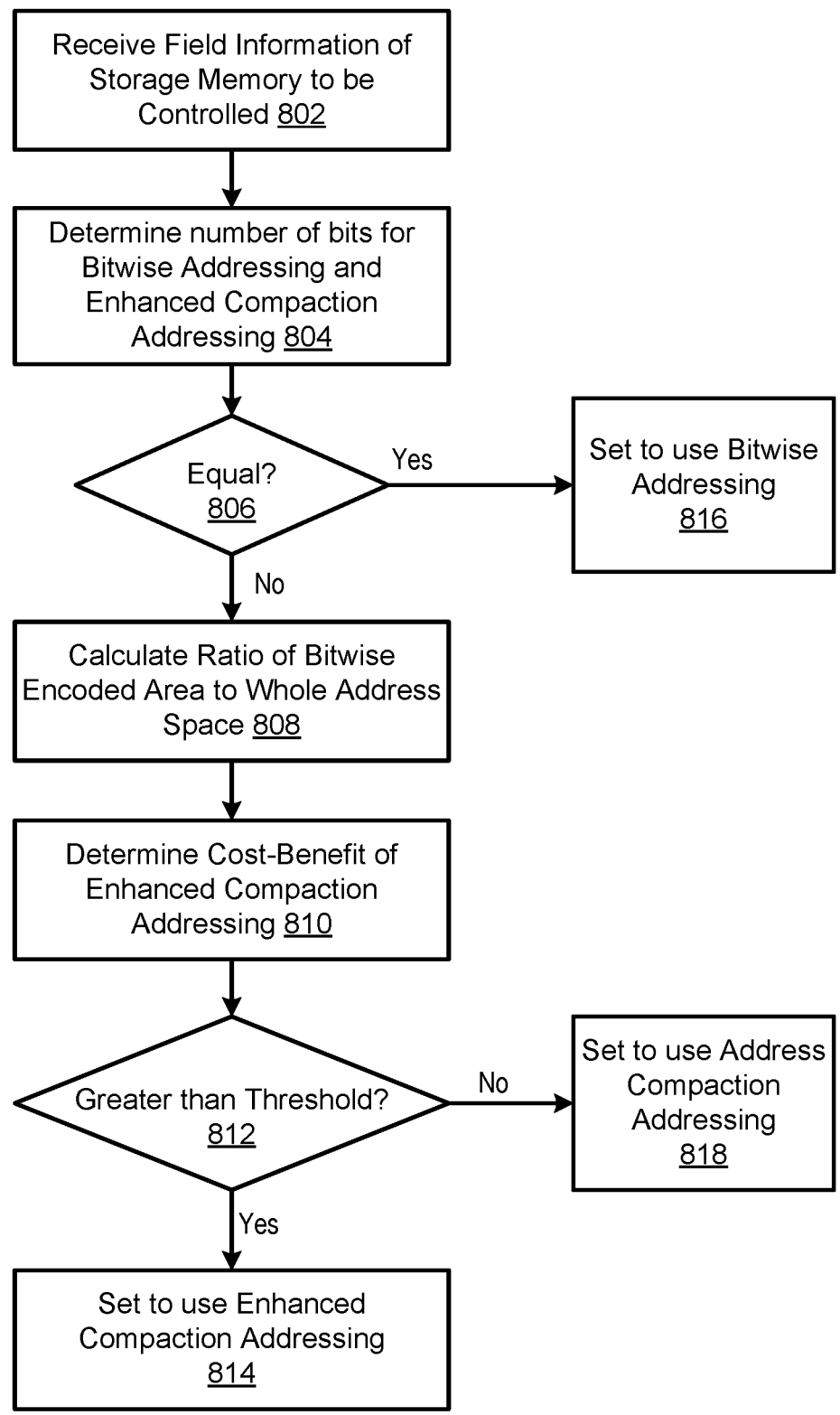
FIG. 8 is a flowchart of a method for selection of an addressing scheme, in accordance with certain embodiments of the present disclosure.

Referring to FIG. 8, a flowchart of a method for selection of an addressing scheme is shown and is generally designated 800. The method 800 can be an embodiment of the systems and techniques discussed above regarding 100, 200, 300, 400, 500, 600 and 700.

At 802, the system may receive field information of a storage memory. For example, a firmware or controller may be initialized and receive specifications of a storage memory to be controlled by the firmware or controller.

At 804, the system may determine a first number of bits that would be needed for bitwise addressing and a second number of bits that would be needed for enhanced compaction addressing.

At 806, the system may determine whether the first number of bits is equal to the second number of bits. If so, the process may move to 816 at which the system may configure the addressing to use bitwise addressing as discussed above. Otherwise, the process may continue to 808.

At 808, the system may determine or calculate a ratio of a potential bitwise encoded section in an enhanced address compaction scheme to the whole address space. In the above example of FIG. 3, the ratio may be determined as (4*4)/(5*6)=53%.

At 810, the system may determine a cost-benefit of the enhanced compaction addressing scheme. The cost-benefit determination may vary from embodiment to embodiment. In some examples, the cost benefit determination may be determined as:

$$\text{Benefit}=((1-R)*(C))+(R*D)$$

where R is the ratio, C is the extra computation from offset linear mapping and D is the computation reduction from using address compaction addressing.

In other examples, the ratio may be utilized directly as a cost-benefit indicator.

At 812, the system may determine whether the benefit is greater than a threshold (or whether the determined benefit meets some other condition). If so, the process may move to 814. Otherwise, the process may continue to 818.

At 814, the system may configure the addressing to use enhanced compaction addressing as described above.

On the other hand, at 818, the system may configure the addressing to use address compaction addressing as described above.

All steps listed for the methods 600-800 may be applied to systems that utilize mapping to and from field based physical addressing. Many variations would be apparent in view of this disclosure. For example, in some embodiments, the selection of the addressing scheme may be performed at build time or may be performed, as discussed above with respect to method 800, upon initialization of the system or connection of a storage controller to the storage memory. Components and circuits used to perform the operations in the method may be discrete, integrated into a system on chip (SOC), or other circuits. Further, the steps can be carried out in a processor (e.g. a digital signal processor), implemented in software, implemented via firmware, or by other means.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the figures and above description provide examples of architecture and voltages that may be varied, such as for design requirements of a system. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A data storage controller apparatus for decoding logical addresses to determine corresponding physical data storage locations comprising:
   a circuit configured to:
      determine a first encoded logical address is in a first range of addresses;

when the first encoded logical address is within the first range of addresses, determine a first physical address in a storage memory from the first encoded logical address using a bitwise mapping scheme, which can determine a physical address location of the storage memory based on a bitwise encoded logical address;
retrieve first data from the first physical address in the storage memory;
determine a second encoded logical address is in a second range of addresses;
determine a second physical address in the storage memory from the second encoded logical address using an offset linear mapping scheme, which can determine a physical address location based on offsets of linear mapped sections of physical storage locations of the storage memory; and
write second data to the second physical address in the storage memory.

2. The apparatus of claim 1, further comprising the circuit further configured to perform the determining the first encoded logical address is in the first range of addresses at least in part based on one or more offsets associated with the first range of addresses and the second range of addresses.

3. The apparatus of claim 1, further comprising the circuit further configured to perform the determining the second encoded logical address is in the second range of addresses at least in part by:
determining a particular section of the second range of addresses which includes the second encoded address.

4. The apparatus of claim 3, further comprising the circuit further configured to perform the determining the particular section of the second range of addresses which includes the second encoded address at least in part on respective offsets associated with the second range of addresses.

5. The apparatus of claim 4, further comprising the circuit further configured to perform the determining of the second physical address from the second encoded address using the offset linear mapping scheme that at least in part is based on calculation values associated with the particular section.

6. The apparatus of claim 5 further comprising the circuit further configured to perform the determining of the second physical address by:
subtracting an offset value of the particular section of the second encoded address from the second encoded address;
perform a linear decoding operation to determine a field-wise location of the second encoded address within the particular section of the second encoded address; and
adding a field-wise section location of the particular section to the field-wise location of the encoded address within the particular section.

7. The apparatus of claim 6, further comprising the circuit further configured to:
determine a third encoded address of a third physical address corresponding to the particular section by:
determining a section linear encoded address for the physical address based on the address location of the physical address in the particular section and a plurality of dimensions of the particular section; and
adding a particular offset value of the particular section to the section linear encoded address.

8. The apparatus of claim 1, further comprising the first range of addresses having one or more dimensions, each dimension of the first range of addresses equal to the largest power of two which is less than or equal to the dimension of a corresponding field of the memory.

9. The apparatus of claim 1, further comprising the circuit configured to:
receive a logical block address (LBA) from a host; and
determine the first encoded logical address based on the LBA.

10. A system comprising:
a storage controller circuit configured to:
determine if a first encoded address is in a first range of addresses;
determine a first physical address in a storage memory from the first encoded address using offset linear mapping when the first encoded address is within the first range of addresses;
determine if a second encoded address is in a second range of addresses;
determine a second physical address in the storage memory from the second encoded address using bitwise mapping when the second encoded address is within the second range of addresses; and
a read/write channel circuit configured to:
retrieve first data from the first physical address in the storage memory in response to a read command received at the storage controller circuit that corresponds to the first encoded address; and
write second data to the second physical address in the storage memory in response to a write command received at the storage controller circuit that corresponds to the second encoded address.

11. The system of claim 10 further comprising the storage controller circuit further configured to perform the determining the second encoded address is in the second range of addresses at least in part based on one or more offsets associated with the second range of addresses.

12. The system of claim 11 further comprising the storage controller circuit further configured to perform the determining the first encoded address is in the first linear range of addresses at least in part by:
determining a particular section of one or more sections of the addresses which includes the first encoded address.

13. The system of claim 12 further comprising the storage controller circuit further configured to perform the determining the particular section of the one or more sections of the addresses which includes the first encoded address at least in part on respective offsets associated with the one or more sections.

14. The system of claim 13 further comprising the storage controller circuit further configured to perform the determining of the first physical address from the first encoded address using offset linear mapping at least in part based on calculation values associated with the particular section.

15. The system of claim 10 further comprising the circuit storage controller configured to:
receive a logical block address (LBA) from a host; and
determine the first encoded address based on the LBA.

16. A method of encoding logical data addresses corresponding to physical data locations of a storage memory, comprising:
receiving, at a storage controller circuit, information related to the storage memory;
determining, by the storage controller circuit, based on the field information, whether to utilize enhanced compaction addressing, where enhanced compaction addressing includes utilizing a first portion of logical data addresses encoded using a bitwise address mapping scheme while another portion of the logical data addresses are encoded using an offset linear mapping scheme;

when the determination determines to use enhanced compaction addressing, utilizing, by the storage controller circuit, enhanced compaction addressing in controlling the logical data addressing of the storage memory; and when the determination does not determine to use enhanced compaction addressing, utilizing, by the storage controller circuit, bitwise addressing in controlling the logical data addressing of the storage memory.

17. The method of claim 16, further comprising performing the determining, based on the field information, of whether to utilize enhanced compaction addressing at least in part by:

determining a first number of bits for bitwise addressing based on the field information;

determining a second number of bits for enhanced compaction addressing based on the field information; and determining not to use enhanced compaction addressing when the first number is the same as the second number.

18. The method of claim 16, further comprising performing the determining, based on the field information, of whether to utilize enhanced compaction addressing based at least in part on a ratio of a bitwise range in enhanced compaction addressing to a whole range of addresses in the storage memory.

19. The method of claim 16 further comprising enhanced compaction addressing utilizing:

bitwise addressing to encode a bitwise range of addresses of the storage memory; and offset linear addressing for one or more offset linear ranges of other addresses of the storage memory.

20. The method of claim 19 further comprising the bitwise range of addresses having one or more dimensions, each dimension of the bitwise range of addresses equal to the largest power of two which is less than or equal to the dimension of a corresponding field of the memory.

* * * * *